Patented Nov. 3, 1942

2,300,702

UNITED STATES PATENT OFFICE 2,300,702

PREPARATION OF SULPHANILYLAMINO-PYRIDINE COMPOUNDS

George W. Raiziss, Philadelphia, Pa., assignor to Abbott Laboratories, North Chicago, Ill., a corporation of Illinois No Drawing. Application October 14, 1939, Serial No. 299,510

1 Claim. (Cl. 260—295)

This invention relates to therapeutic compounds and more particularly to sulphanilylamino-pyridine compounds.

The following example of a preferred process for preparing a compound of the present invention will serve for illustrative purposes.

EXAMPLE

2-sulphanilylaminopyridine

About 100 c.c. of acetone, 58 grams of p-acetyl-amino-benzene sulphonyl chloride, 29 grams of alpha-amino-pyridine and 20 c.c. of pyridine are first added to a 500 c.c. flask. This mixture (which becomes warm indicating a chemical reaction is taking place) is allowed to stand for about 24 hours with occasional shaking and stirring e. g. with a glass rod. A crystalline precipitate separates which after standing turns to a gummy layer. About 4 volumes of water are then added to the reaction mixture, and the precipitate, separated by filtration, washed well with fresh water. This product is 2-acetylsulphanilylamino-pyridine.

The acetyl product obtained, for example, by the above method may be hydrolyzed by the use of dilute acid or alkaline solutions in the usual manner. If the acid hydrolysis is used the acyl product is suspended in 10 volumes of 1 per cent hydrochloric acid and the mixture boiled under a reflux until the solution is clear, e. g. ordinarily around 2-3 hours refluxing is sufficient. The reaction mixture is then cooled and filtered, and solid sodium carbonate added with mixing until the mixture is just acid to litmus. The precipitate obtained is separated by filtration, washed with water and recrystallized from a 50 per cent alcohol solution. If the alkaline hydrolysis is used the acyl product is dissolved in 5 volumes of 10 per cent sodium hydroxide solution and refluxed for about 1.5 hours. The reaction mixture is then cooled and dilute hydrochloric acid added until the mixture is just acid to litmus. The crystalline precipitate obtained by filtration is washed with water and recrystallized from alcohol as described above in the acid deacetylation process.

The final product obtained by the above is 2-sulphanilylamino-pyridine and may be represented by the following formula:

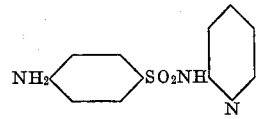

It will be understood by those skilled in the art that in place of acetylaminobenzene sulphonyl chloride used in the above example that other acylaminobenzene sulphonyl halides may be substituted therefor, e. g. propionyl- or butyryl-amino benezene sulphonyl chlorides or bromides. It will also be understood that in place of alpha amino pyridine that other amino pyridines may be substituted therefor, e. g. beta amino pyridine.

All modifications falling within the scope of the present invention are intended to be covered by the following claim.

I claim:

A process of making 2-acetylsulphanilylamino-pyridine which comprises reacting p-acetyl-aminobenzene sulphonyl chloride with alpha amino pyridine in a reaction medium consisting essentially of a mixture of acetone and pyridine.

GEORGE W. RAIZISS.